June 1, 1937. J. M. W. CHAMBERLAIN 2,082,381
SHIPPING AND/OR STORING PERISHABLE COMMODITIES
Filed March 19, 1935 3 Sheets-Sheet 2
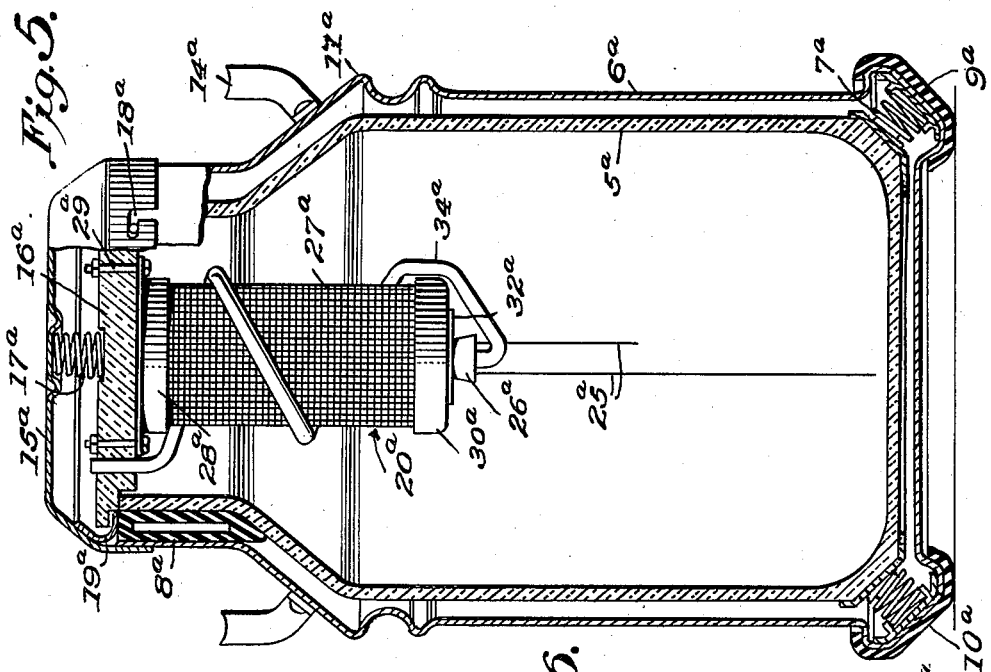
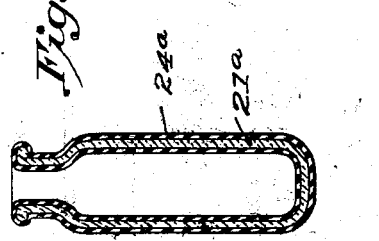
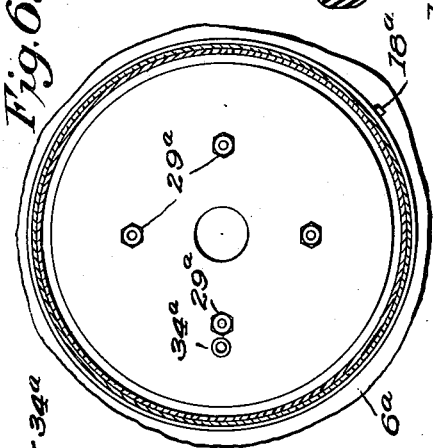
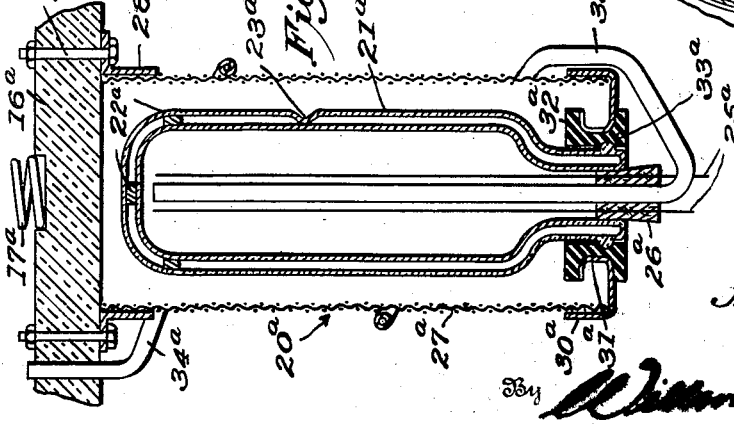
Inventor
J.M.W. CHAMBERLAIN
By William N. Knight
Attorney June 1, 1937. J. M. W. CHAMBERLAIN 2,082,381
SHIPPING AND/OR STORING PERISHABLE COMMODITIES
Filed March 19, 1935 3 Sheets-Sheet 3
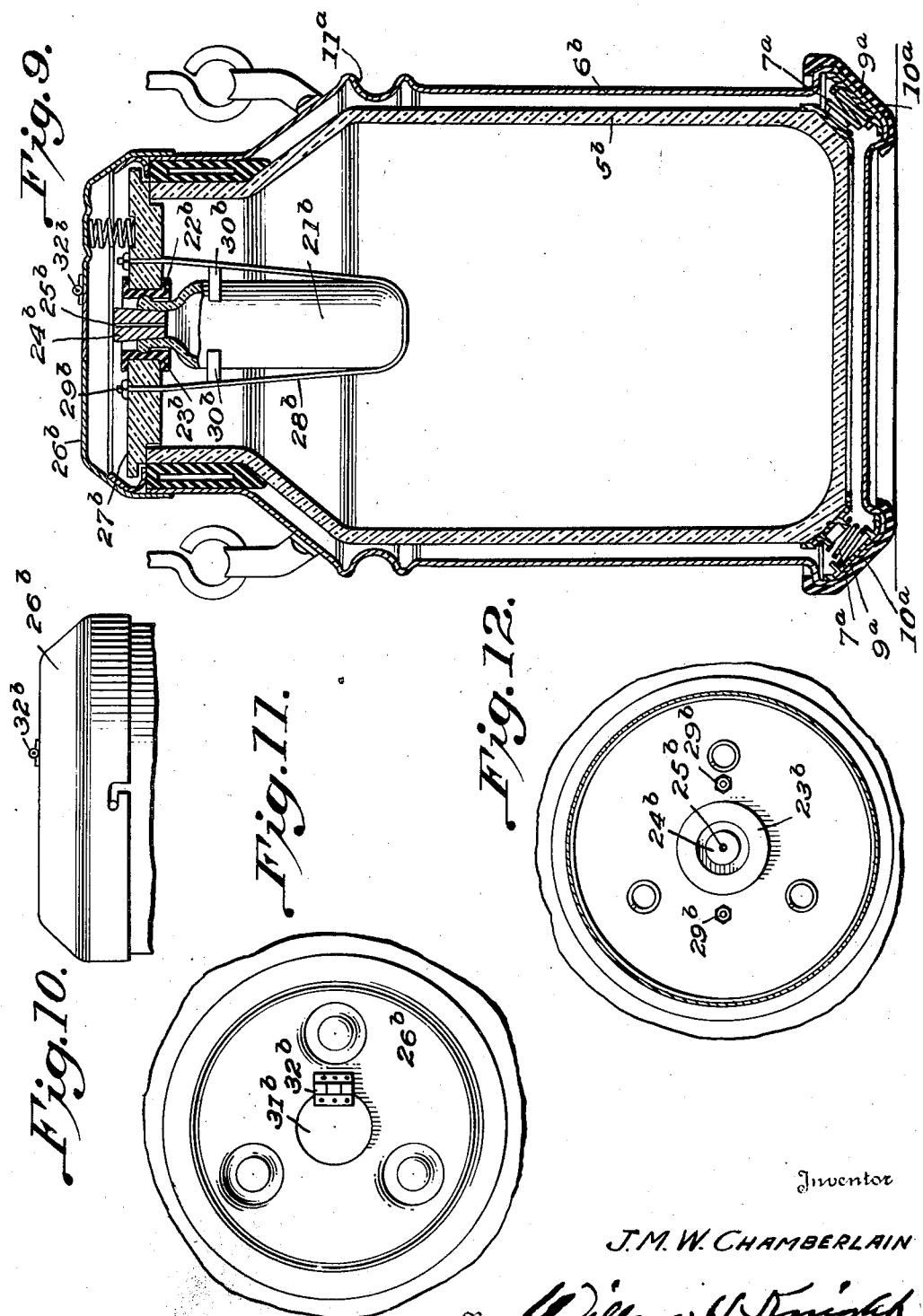
Inventor
J. M. W. CHAMBERLAIN
By William N. Knight
Attorney Patented June 1, 1937

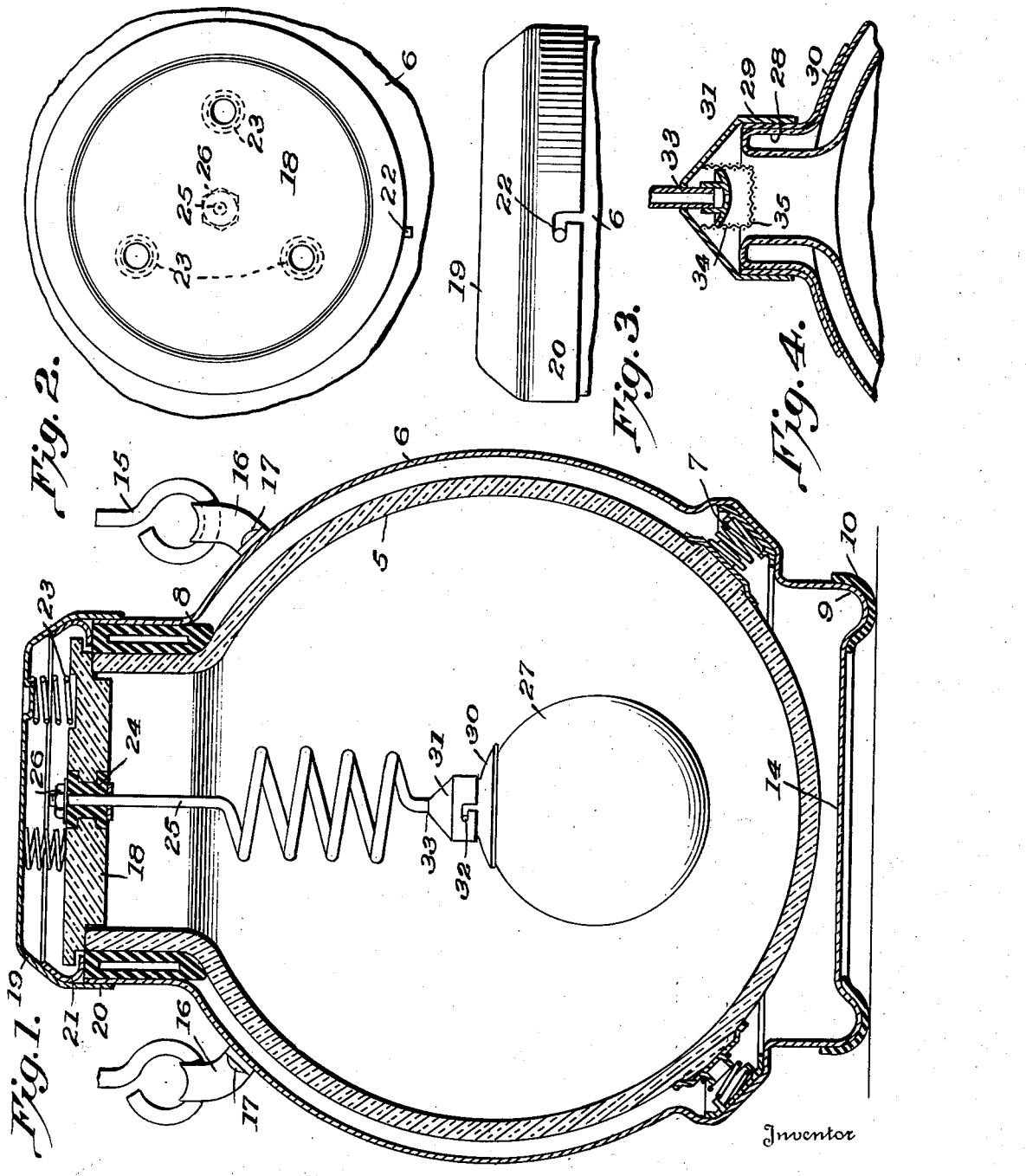

2,082,381

UNITED STATES PATENT OFFICE 2,082,381

SHIPPING AND/OR STORING PERISHABLE COMMODITIES

James M. W. Chamberlain, Akron, Ohio

Application March 19, 1935, Serial No. 11,864

4 Claims. (Cl. 62—91.5)

My present invention relates to a method of and the equipment for shipping and/or storing perishable commodities particularly those commodities such as liquid and solid food stuff which require a more or less definitely controlled temperature to maintain their physical properties in the desired state of preservation when packed or otherwise handled for transportation or storage.

The improved method and the equipment for practicing the same has a more or less flexible field of use in that the equipment may be made readily adaptable to accommodate various kinds of commodities each of which may require a different treatment to maintain it in the desired condition.

To explain these possibilities more clearly I should point out at this time that the method and equipment is concerned primarily with refrigeration, especially individually refrigerated containers, preferably of the portable transporting type. For the most part the equipment is intended for shipping those edible commodities which are not canned or preserved by artificial means other than refrigerating to maintain the same in the desired condition. Different kinds of commodities require not only different temperature conditions to realize the best results, but also different ways of treatment. As an example, I propose to take advantage of the efficiency, economy and convenience offered by the use of a chemical refrigerant, such as solidified carbon dioxide. With some commodities it may not be harmful to permit the escape of $CO_2$ gas from such a refrigerant to directly contact the commodity, in other instances it would be prohibited. My equipment accounts for these and other similar conditions by a simple and practical change over in the assembly of parts which go to make up the individual containers.

As a further explanation of the nature and application of the invention my equipment preferably consists of a well insulated portable container within which is housed a readily interchangeable capsule-like holder for the chemical refrigerant. The refrigerant holder being so supported that it may be easily exchanged for one of a different kind depending upon the kind of commodity to be refrigerated or the different sort of refrigerating result desired to be accomplished.

For the purpose of illustrating the invention I have shown in the accompanying drawings several modified types of containers as a medium by which the method may be reduced to practice. I have also shown various types of refrigerating capsules or cartridges in combination with these containers.

Obviously those skilled in the art may make various changes in the construction of the equipment, shown in the drawings, and the method to be hereinafter described, without departing from the spirit and scope of the invention as defined by the appended claims and I therefore do not wish to be limited to the precise embodiments of the equipment or the specific nature of the method explained.

In the accompanying drawings—

Figure 1 is a view in vertical section of a container constructed in accordance with one form of the invention and also showing one type of refrigerant cartridge or capsule;

Fig. 2 is a top plan view of the cover for the container shown in Fig. 1;

Fig. 3 is a view in side elevation of the cover;

Fig. 4 is a detail view in section of the suspension for the refrigerant cartridge;

Fig. 5 is a view in vertical section of another form of container and refrigerant cartridge;

Fig. 6 is a top plan view of the lid for the container;

Fig. 7 is a detail view in section of the refrigerant cartridge shown in Fig. 5;

Fig. 8 is a detail view in section of a modified form of cartridge;

Fig. 9 is a view in section of still another form of container and another form of cartridge;

Fig. 10 is a view in side elevation of the cover of the container shown in Fig. 9;

Fig. 11 is a plan view of the same cover, and

Fig. 12 is a plan view of the lid for the container shown in Fig. 9.

Referring first to the embodiments shown in Figs. 1 to 4 inclusive 5 represents a spherical shaped jar-like receptacle which is preferably molded from some non-corrosive material, suitable for the purpose, such as glass, ceramic or the like. In lieu of this material some other material may serve the same purpose providing the inside was coated or otherwise treated to have the same sanitary and non-corrosive properties. The idea being to provide a holder for the commodity which will not corrode or become otherwise unsuitable for the purpose of maintaining the commodity in a fresh and sanitary condition. Aside from these requisites the material of the receptacle 5 should, when possible have a low heat conductivity so as to aid as much as possible in insulating the contents.

6 represents an outer metallic jacket which surrounds the receptacle 5 in spaced relation thereto. This spaced relation of the inner and outer sections is maintained by the spring devices 7 which occupy the space between the sections adjacent the bottom and the band-like cushion 8 which is inserted in the space between the neck portions of the sections. These spring devices and the cushion 8 serve not only to space the sections apart but they also provide a resilient suspension for supporting the more or less fragile inner section and thus protecting the same from damage due to the abuse in handling the container. As an added precaution against such damage the circularly formed rim 9 on the base of the outer section may be equipped with a rubber or the like covering 10.

A plurality of these spring devices 7 will be employed and each will preferably be confined between opposed seats made to hold them in place. One of the seats being fitted to a projection formed on the inner receptacle 5 and an opposed seat being formed on the carrier which is fitted within the circular channel formed in the outer jacket 6. Instead of these particular spring devices any other suitable means may be used as a support. In other words the present showing is simply for the purpose of explaining the desireability of using a resilient spacing and support.

The bottom 14 of the jacket is formed as an inset disc so as not to contact the floor or other surface upon which the container may rest. The configuration of the base of the jacket as well as the corrugation 13 will also strengthen the structure of the jacket and aid in providing a serviceable construction.

To facilitate handling the container the same should be equipped with hand grips, handles, or else a bale 15 which is secured by the bale ears 16 and which in turn are riveted as at 17 to the side of the jacket.

The cover assembly comprises a relatively thick lid 18 having stepped circular under cuts, so as to leave a thickness which depends within the opening in the container, a ledge portion which rests upon the rim of the opening and an over hang at the periphery of the lid. In addition to the lid a cap or cover 19 is provided for. This cap may be made of metal whereas the lid 18 is preferably made of the same kind of material as the inner receptacle 5.

The cap has a skirt portion 20 which slips over the neck of the jacket and a separately formed and inwardly turned insert 21 provides a stop which rests upon the band cushion 8 immediately under the over hang on the lid. By this assembly the lid may be removed with the cap. As best shown in Fig. 3 the cap is provided with a bayonet joint retainer 22.

Seated in depressions in the lid and with their opposite ends engaging projections on the inside of the cap 19 are a plurality of coiled springs 23 which serve to retain the lid in place upon the rim of the container. These springs are put under tension when the bayonet joint 22 is locked so that the lid thus is held down under the influence of the springs.

Embedded in a central opening in the lid 18 is a rubber insert 24. A center bore in this insert is made to admit the end of the vent tube 25. The tube terminates in the space between the cap and lid and a nut and washer 26 is threaded on the end of the tube to hold the same secured to the lid.

This tube 25 provides the duel purpose of suspending the refrigerant cartridge 27 within the container and to also vent the $CO_2$ gas outside the container where it can not damage the commodity carried by the container.

For the form of the cartridge 27 shown in Figs. 1 and 4 I propose to use a double walled glass or the like sphere and to equip the neck 28 of the same with a metal collar 29 which has a depending cape 30 flared to conform to the shape of the cartridge. This collar and cape is made as a permanent part of the cartridge. The collar serves as one part of a detachable connection with the tube 25. The other part of this connection is arranged for by a cone-shaped cap 31 which fits around the collar 29 and is secured in place thereon by the bayonet joint 32. The cone of the cap 31 has an opening as at 33 to admit the tube 25. The tube thus enters the cap with its end terminating well within the cap and approximately co-axially with the opening into the cartridge. The tube may be fixed to the cap in any suitable manner, as for example, a soldered connection where it enters the cap through the opening at 33. Carried on to the end of the tube is a baffle 34 and a wire screen 35 encloses the same so that only the $CO_2$ gas is allowed to enter the tube.

The foregoing clearly explains the construction of the form of the container shown in Figs. 1 to 4. The method of treating or handling a perishable food product with this equipment would usually be carried out as follows:

The receptacle with the contents therein should be first subjected to general refrigeration so as to bring the temperature of the same down to that at which the contents are to be maintained during storage and/or transportation. This step is performed before the cartridge is applied and it is necessary as the cartridge is not designed for precooling purposes, nor could it serve as an initial cooling medium and at the same time operate efficiently to control the temperature within predetermined limits. By removing the cone cover on the cartridge the same may be packed with the refrigerant, solidified carbon dioxide for instance. When thus packed the cartridge may then be suspended within the precooled container by setting the lid and cover in place over the opening. In the form of the container shown in these Figs. 1 to 4 the contents come in intimate contact with the cartridge as well as the vent tube. This is entirely permissible with some commodities and it is evident that both the latent heat of sublimation of the solid carbon dioxide and the cooling value of the gas vented through the tube will develop the necessary refrigerating values. The rate of heat transferred through the cartridge and vent tube should be balanced relatively to the rate of heat absorption through the walls of the container. To realize this balance the cartridge is so insulated that it will permit approximately the same number of thermal units to pass through its wall and vaporize the refrigerant as those thermal units that are absorbed through the walls of the container. This balance is established and maintained according to my improved method, at least so far as concerns the embodiment shown in Figs. 1 to 4, by a predetermined spacing of the double walls of the cartridge, the length of the vent tube and the degree of evacuation of the air within the space between the double walls of the cartridge. The length of the tube can be determined by the number of coils used. In other embodiments which will be later described I have disclosed other ways and means for controlling this balance.

This control is one of the outstanding features of my invention. I have found in practice that this method of control enables me to maintain the temperature of a commodity within a container to a plus or minus two (2) degrees for periods of sixty (60) hours. It is of course appreciated that the time factor is determined, for the most part, by the capacity of the cartridge in comparison with the capacity of the container. A large capacity cartridge would have to be more thoroughly insulated than a smaller one to prevent too rapid a transfer of heat through its walls.

I also desire to point out that the extent of insulating the cartridge and the total rate of heat transfer through its walls should be predetermined and standardized for a given application of the method. In other words each type of container and cartridge should be constructed to meet a specific requirement. For instance, a cartridge of a certain specification would be required to cool a ten (10) gallon milk container which was to be shipped over a route necessitating a certain number of hours to reach its destination and at an average outside air temperature. It follows of course that for the same container, same contents and same route, a cartridge of a different specification would be needed in summer than required in winter. This and other required changes in the type of cartridge may be easily accounted for because as previously stated the cartridges are carried by the cover assembly which enables them to be readily interchangeable whenever occasion demands. In other words, anyone of several different types of cartridge may be selectively used with any given type of container.

It is obvious that the better insulated the container is, the more efficient the method of cooling. This accounts for the spherical shape of the receptacle shown in Fig. 1. This spherical shape reduces to a minimum the surface area per unit of contents. I prefer this shape for this reason.

While the above described method, when practiced with my equipment, has proven a practical solution of the problems involved in handling perishable commodities, I have in mind still another step which will materially aid in preserving the inherent qualities of those commodities which are particularly adapted to artificial preservation for the purpose of destroying the effects of bacteria. It is already known that the bacteria content of most perishable foodstuffs can be destroyed, or at least maintained dormant, for all practical purposes, by passing the commodity through, or otherwise subjecting the same to a high frequency electrical field. Such a sterilizing treatment not only fits in well with my method of handling but the equipment too is especially adapted for this purpose. In carrying out this sterilizing step it is necessary that the commodity be contained in a non-conducting vessel during the treatment. When the container 5, is fashioned from ceramic or other non-conducting material, as it will be in most instances, it may be removed from its outer protective jacket and used as a vessel for this high frequency sterilizing treatment. After such treatment it may then be replaced within the jacket with the commodity remaining therein and the whole being now ready for storing or shipping under the protective conditions induced by my refrigerating scheme.

The equipment shown in Figs. 5 to 12 inclusive embraces the same general characteristic features but here the receptacle, as well as the refrigerant cartridge, has been modified to some extent to illustrate, at least, a few of the many embodiments employed.

The method practiced with these modified forms differs little, if any, from that heretofore described, except perhaps in some details.

Referring to the modifications shown in Figs. 5 to 8 inclusive, 5a represents the inner container which is of a different design than the container 5 only so far as its shape is concerned. The container 5a is housed within the protective jacket 6a and supported in spaced relation relatively thereto by the spring devices 7a which occupy the space between the container and the jacket walls at the base of the assembly. These springs 7a are mounted in substantially the same manner as the springs 7 in Fig. 1. A band-like spacing cushion 8a, substantially the same as the cushion 8 in Fig. 1, fits the space between the walls at the neck of the receptacle. The base of the jacket is formed with an offset circular rim 9a to provide a pocket for the spring mountings. The rim 9a is covered with a rubber tread 10a which serves as an added protection for the container. As a means of strengthening the jacket it may be corrugated as at 11a. Hand grips 14a are arranged on opposite sides of the jacket so as to enable the receptacle to be easily handled. The cover or cap 15a and the lid 16a, like the cover assembly in Fig. 1, are given the benefit of spring devices 17a for the same purpose. The cap is also held in place by a bayonet joint catch 18a and the retaining ring 19a also forms a part of the assembly.

The refrigerant cartridge 20a in this form is of a different design and while its general purpose is the same as the type shown in Fig. 1, it has been designed for use with a commodity for which the first described cartridge would be unsuitable. The cartridge 20a is fashioned as a blown vacuum bottle 21a, the double walls of which have a predetermined spacing with a predetermined degree of evacuation. This is for the purpose of controlling the rate of heat transfer through the cartridge in the same manner as heretofore explained. To effect a more definite or accurate control, metal or other heat conducting inserts 22a may be used in the vacuum space in contact with the inner and outer walls. The number of inserts used will be determined by the rate required to balance the absorption of heat through the insulated walls of the container and jackets. As another means of realizing this compensating balance the inner or outer walls of the cartridge may be indented, as at 23a at predetermined intervals. Still another means of accomplishing this purpose is shown in Fig. 8 where the walls of the cartridge are sheathed with rubber 24a or some other covering suitable for the purpose. Still another way of accounting for this balance comprises the use of varying lengths of absorbing wires, tubes, plates or the like 25a. These wires, etc., extend into the refrigerating compartment of the cartridge through openings made to admit them in the stopper 26a which plugs the throat of the cartridge. The protruding lengths of these wires, etc. may vary according to the balance desired to be maintained.

The cartridge 21a is suspended by a stainless steel or other non-corrosive mesh cage 27a which is hung from the lid 16a by a flanged ring 28a. The lateral flange on the ring lays flush with the under side of the lid and bolts 29a hold the same in place. The lower end of the cage is reinforced by a ferrule 30a. The center of this ferrule is stamped to leave an opening with an upstanding rim 31a formed to hold a rubber gasket 32a. The opening in the gasket receives the neck of the cartridge and thus suspends the same in a resilient support. A bead 33a on the neck of the cartridge seats in a groove in the gasket to hold the cartridge in place.

The escaping $CO_2$ gas from the cartridge is vented through the tube 34a which winds around the cage with its discharge end projecting through an opening in the lid and terminating in the space between the lid and cap exteriorly of the container.

As explained with reference to Fig. 1 this vent tube has some refrigerating values, therefore by varying the length of the same its effectiveness can be predetermined.

In Figs. 9 to 12 I am showing still another form of cartridge and a different manner of using the same. In this type the cartridge 21b is a single wall structure and the assembly does away with the vent tube with attendant sacrifice of the cooling value of the tube. Instead of using a tube to vent the $CO_2$ gas the mouth 22b of the cartridge fits into a rubber gasket 23b. The mouth is plugged by a stopper 24b which has a vent hole 25b to allow the escape of the $CO_2$ gas into the space between the cap 26b and the lid 27b.

The cartridge is suspended by a cage constructed of a plurality of strap-like hangers 28b, the ends of which are anchored in the lid as clearly shown at 29b. Lateral clamps 30b carried by the straps embrace the cartridge on opposed sides to hold the same steady.

Where the container is used for a commodity which will not be destroyed or otherwise affected when coming in direct contact with the $CO_2$ gas the cartridge 21b may be inverted, thus allowing the $CO_2$ gas to pass through the contents. In this way the cooling value of the gas may be utilized.

I am also showing a circular trap door 31b in this form. This door is provided in the cap 26b and the hinge 32b permits the same to swing outwardly as a relief valve.

The container 5b and the jacket 6b together with the parts thereof which make up their assembly are the same as in the form shown and described in Fig. 5.

What I claim is:—

1. Equipment for shipping and/or storing perishable commodities which require a critical temperature range to preserve their freshness, comprising a spaced wall receptacle, a cover assembly therefor, comprising a lid and cover with a space therebetween, spring devices in the space between the cover and lid to hold the lid in place under the influence of the spring devices, an insulated chemical refrigerant cartridge, a vent tube for the cartridge supporting the same from the lid in the presence of the commodity, said tube projecting through the lid with its discharge end terminating in the space between the lid and cover, said cartridge comprising a double wall refrigerant holder with a vacuum space between said walls having a predetermined insulating value for controlling the rate of sublimation of the refrigerant in balanced relation to the effective absorption of thermal units through the walls of the receptacle.

2. Equipment for shipping and/or storing perishable commodities which require a critical temperature range to preserve their freshness, comprising a spaced wall receptacle, a cover assembly therefor, comprising a lid and cover with a space therebetween, spring devices in the space between the cover and lid to hold the lid in place under the influence of the spring devices, an insulated chemical refrigerant cartridge for said receptacle, a cage-like holder for said cartridge supporting the same beneath the lid, a vent tube for the cartridge encircling the cage-like holder with its discharge end projecting through the lid into the space between the lid and cover, said cartridge comprising a double wall structure with a vacuum space between the walls, and means interrupting the space between the walls at intervals and co-operating with the vacuum space; whereby the insulating value of the vacuum space may be regulated for controlling the rate of sublimation of the refrigerant in balanced relation to the effective absorption of thermal units through the walls of the receptacle.

3. Equipment for shipping and/or storing perishable commodities which require a critical temperature range to preserve their freshness, comprising a spaced wall receptacle, a cover assembly therefor, comprising a lid and cover with a space therebetween, spring devices in the space between the cover and lid to hold the lid in place under the influence of the spring devices, a chemical refrigerant cartridge for said receptacle, and means for controlling the rate of sublimation of the refrigerant in balanced relation to the effective absorption of thermal units through the walls of the receptacle, comprising a thermal absorbing member projecting from the interior of the refrigerant cartridge and terminating within the receptacle, the length of said member determining its effective value.

4. Equipment for shipping and/or storing perishable commodities which require a critical temperature range to preserve their freshness, comprising a spaced wall receptacle, a cover assembly therefor, comprising a lid and cover with a space therebetween, spring devices in the space between the cover and lid to hold the lid in place under the influence of the spring devices, a chemical refrigerant cartridge for said receptacle carried by the lid, said lid having an opening in its thickness to admit the mouth of said cartridge and a plug for the mouth of the cartridge having a vent hole therein for venting the cartridge in the space between the lid and cover.

JAMES M. W. CHAMBERLAIN.